United States Patent
Rombeaut et al.

(10) Patent No.: US 7,184,394 B2
(45) Date of Patent: *Feb. 27, 2007

(54) ROUTING SYSTEM PROVIDING CONTINUITY OF SERVICE FOR THE INTERFACES ASSOCIATED WITH NEIGHBORING NETWORKS

(75) Inventors: Jean-Pierre Rombeaut, Maubeuge (FR); Yves Saintillan, Massy (FR)

(73) Assignee: Alcatel, Paris (FR)

( * ) Notice: Subject to any disclaimer, the term of this patent is extended or adjusted under 35 U.S.C. 154(b) by 981 days.

This patent is subject to a terminal disclaimer.

(21) Appl. No.: 10/042,178

(22) Filed: Jan. 11, 2002

(65) Prior Publication Data
US 2002/0089990 A1   Jul. 11, 2002

(30) Foreign Application Priority Data
Jan. 11, 2001 (FR) .................................. 01 00308

(51) Int. Cl.
H04L 12/56 (2006.01)
(52) U.S. Cl. ...................................... 370/219; 370/401
(58) Field of Classification Search ................ 370/219, 370/220, 401
See application file for complete search history.

(56) References Cited

U.S. PATENT DOCUMENTS

| | | | |
|---|---|---|---|
| 5,473,599 A | | 12/1995 | Li et al. |
| 6,049,524 A | * | 4/2000 | Fukushima et al. ......... 370/220 |
| 6,073,184 A | * | 6/2000 | Couturier et al. ........... 719/313 |
| 6,577,634 B1 | * | 6/2003 | Tsukakoshi et al. ... 370/395.31 |
| 2002/0089980 A1 | | 7/2002 | Rombeaut et al. |
| 2002/0167952 A1 | * | 11/2002 | Watson et al. .............. 370/401 |
| 2002/0186653 A1 | * | 12/2002 | Jensen ........................ 370/219 |
| 2003/0046604 A1 | * | 3/2003 | Lau et al. ..................... 714/11 |
| 2003/0056138 A1 | * | 3/2003 | Ren .............................. 714/4 |

FOREIGN PATENT DOCUMENTS

WO   WO 02/47329 A2   6/2002

OTHER PUBLICATIONS

J. Moy: "IETF STD. 54 (RFC 2328): OSPF Version 2"'en lignel, IETF XP002176650, Apr. 1998, p. 68.

* cited by examiner

Primary Examiner—Brian Nguyen
(74) Attorney, Agent, or Firm—Sughrue Mion, PLLC

(57) ABSTRACT

A router includes at least two router modules, one of which is in an active state at any given time, the others being in a standby state, and a changeover capability making it possible to cause one of the other router modules to go from a standby state to an active state when the router module in the active state stops, each of the router modules having connections with one or more networks, and having at least one state machine, each state machine managing the interface associated with one of the connections. In the router, each of the router modules has data storage capability which, in the active state, enables it to store data relating to the state of the at least one state machine, when the machine is in a stable state, and data retrieval capability for retrieving the data when a changeover takes place.

7 Claims, 2 Drawing Sheets

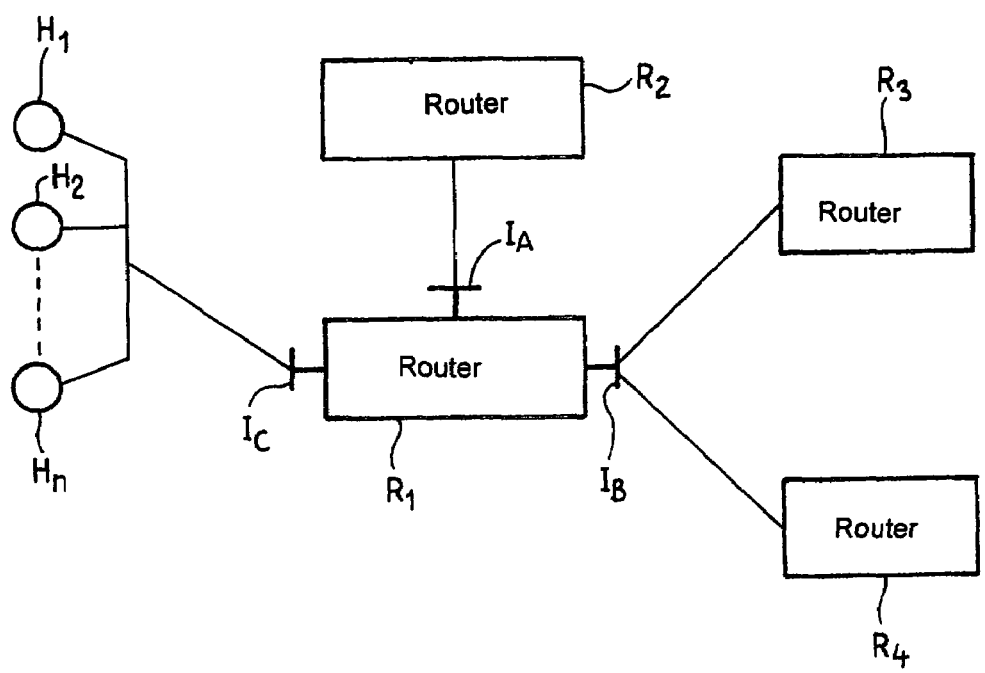
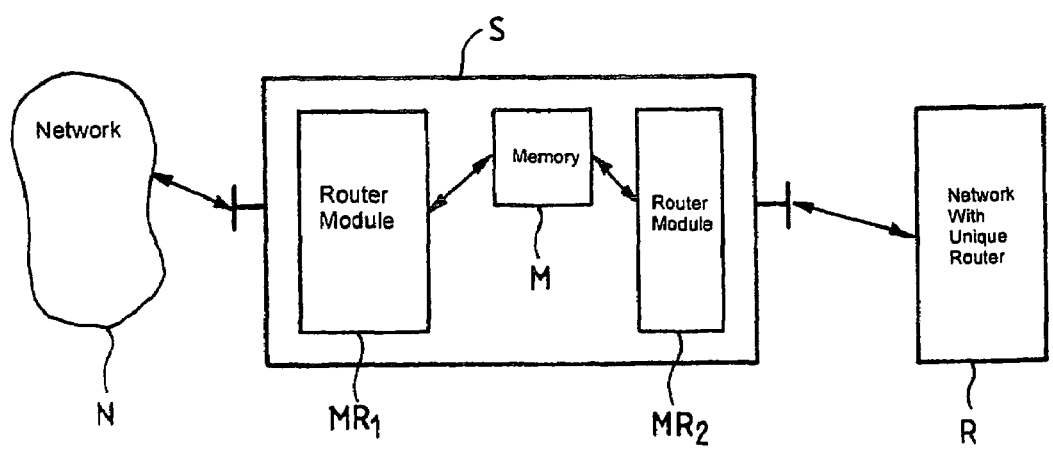

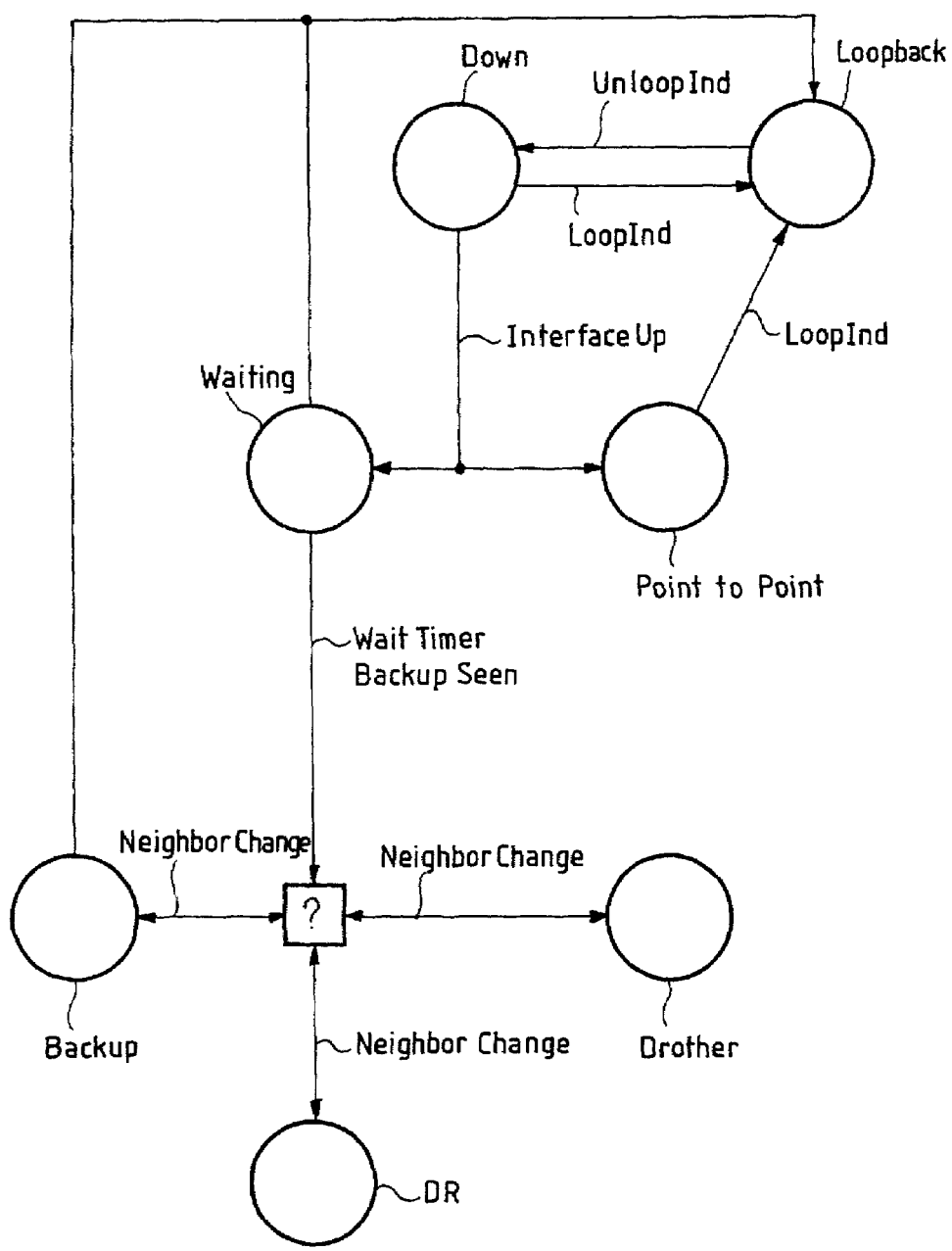

ROUTING SYSTEM PROVIDING CONTINUITY OF SERVICE FOR THE INTERFACES ASSOCIATED WITH NEIGHBORING NETWORKS

The present invention relates to continuity of the routing service in a network of the Internet Protocol (IP) type. The invention can be applied particularly well to the Open Shortest Path First (OSPF) protocol, as defined in the Request For Comments (RFC) 2328 of the Internet Engineering Task Force (IETF).

BACKGROUND OF THE INVENTION

The OSPF protocol is a protocol of the Transmission Control Protocol/Internet Protocol (TCP/IP) family making it possible for the routing systems or "routers" of an Internet network to have sufficient knowledge of the network to route the received packets correctly to their destinations.

The particularity of the OSPF protocol is that it is a dynamic routing protocol, i.e. it is capable of taking account of changes in the topology of the network in dynamic manner. For this purpose, the protocol has steps in which messages are exchanged periodically, in order to update constantly the knowledge that each router possesses of the network or of a portion of the network.

FIG. 1 shows a possible environment for a router $R_1$. In this example, it is connected to three networks.

It is connected to a network made up of a single router $R_2$ via a point-to-point connection (e.g. a serial link).

It also has a second connection with a network made up of two routers $R_3$ and $R_4$. For example, this network may be of the point-to-multipoint type, of the broadcast type, or of the non-broadcast multiaccess type.

Finally, it has a third connection with a network made up of a set of host stations $H_1, H_2, \ldots, H_n$. This type of network is known as a "stub network".

At regular intervals, the router $R_1$ transmits a "hello" message over each of its connections in order to indicate to its neighbors that it is still active. It also receives "hello" messages from its neighbors, also indicating that they are still active.

"Hello" messages are transmitted (i.e. sent out and received) via physical interfaces. In accordance with the OSPF protocol, each router has a physical interface for each connection. In the example shown in FIG. 1, the router $R_1$ therefore has three interfaces, namely $I_A$ with the router $R_2$, $I_B$ with the routers $R_3$ and $R_4$, and $I_C$ with the set of host stations.

Each of the interfaces is managed by a state machine that is dedicated to it. Such a state machine is represented by FIG. 2.

As is conventional, the circles represent the states which the interface can occupy. At any given time, the interface must be in one of these states. Each arrow in the diagram represents a transition from one state to another.

The names of the states are given in the diagram, as they appear in RFC 2328.

The initial state of the state machine is represented by the circle referenced "Down". In this initial state, the interface does not allow any traffic to pass.

The "InterfaceUp" event indicates that the interface becomes operational, and that the state machine must exit the "Down" state. There are then two possibilities, as a function of the type of connection managed by the interface. When the connection is of the "point-to-point" type with another router (as it is between the routers $R_1$ and $R_2$ in the example shown in FIG. 1), the state machine goes to a state referenced "Point to Point". Otherwise, the state machine goes to the "Waiting" state.

Using the example shown in FIG. 1, and assuming that the state machines were previously in the "Down" state, the occurrence of an "InterfaceUp" event causes the state machines of the interfaces $I_C$ and $I_B$ to go to the "Waiting" state, and causes the state machine associated with the Interface $I_A$ to go the "Point-to-Point" state.

In this "Waiting" state, the state machine triggers transmission of "Hello" messages to discover the state of the connection. Another object of transmitting such "Hello" messages is to determine the designated router (DR) and the backup designated router.

This concept of "designated router" corresponds to electing a reference router from among a set of routers, the data that the other routers in the set possess about the network being synchronized by those routers on said designated router. This data is stored in each router in a database.

In compliance with the OSPF protocol, each router has routing tables making it possible to route the packets received in an entire region of the network. The routing tables are computed by the routers on the basis of the databases. To ensure that the routing tables are constantly up to date, the routers exchange messages for updating their databases.

In order to reduce the traffic over the network, a designated router is therefore established via which the other routers update their own databases.

This "election" mechanism is described more precisely in the IETF's RFC 2328.

It is important herein merely to note that the "Waiting" state corresponds to a stage of listening to the network in order to determine whether a designated router or a backup designated router already exists.

This state ends with the appearance of a "WaitTimer" event indicating that a predetermined time (typically 40 seconds) has elapsed, or of a "BackupSeen" event indicating that a backup designated router has been detected.

Depending on the result of this election stage, the state machine goes respectively to the "DR" state, to the "Backup" state, or to the "DROther" state.

The "NeighborChange" event occurs when there is a change in the network connected to the physical interface in question that has an impact on the designated router and/or on the backup designated router. This event may trigger a change of state in the state machine.

Finally, the "Loopback" state indicates that the interface is looped back on itself, i.e. it cannot receive messages from outside the router. The state machine goes to this state after a "LoopInd" event. It exits from it by means of the "UnLoopInd" event and goes to the "Down" state.

When a router is re-started, e.g. after a failure, the state machine thus has to re-start in the "Down" state. The other routers in communication with it are then warned of this change, and they can also be subjected to a change of state in their own state machines by triggering a "NeighborChange" event.

In order to minimize the consequences of the router failing or of it being shut down temporarily for maintenance purposes, it is possible to provide for redundancy in the routing function implemented by the routers.

Such redundancy can be achieved by having an active router and a standby router. The standby router becomes active when the active router stops, e.g. due to failure.

Such a solution is, in particular, implemented by Cisco, in the Hot Standby Router Protocol (HSRP).

Another redundancy solution is described in IETF's RFC 2338, entitled "Virtual Router Redundancy Protocol".

However, in that solution as well, when a first router in the active state fails and causes the standby second router to take over, the state machines managing the interfaces with the various connections of the router in question must re-start in the "Down" state.

That results in the second router being unavailable for a time lapse before it can return to the state in which the first router was before it failed or stopped. That delay is at least as long as the waiting time prior to election, i.e. typically 40 seconds.

Re-starting state machines also suffers from the drawback of causing changes in the states of the neighboring routers.

OBJECTS AND SUMMARY OF THE INVENTION

An object of the invention is to mitigate those drawbacks. To this end, the invention provides a router made up firstly of at least two router modules, only one of which is in an active state at any given time, the others being in a standby state, and secondly of changeover means making it possible to cause one of said other router modules to go from a standby state to an active state when the router module in the active state stops, each of said router modules having connections with one or more networks, and having at least one state machine, each state machine managing the interface associated with one of said connections. In the invention, each of said router modules has data storage means which, in the active state, enable it to store data relating to the state of said at least one state machine, when said machine is in a stable state, and data retrieval means for retrieving said data when a changeover takes place.

Thus, by means of the data storage, the router module in the standby state is capable of taking over in the same state as the state in which the router module in the active state was before it stopped or failed.

Thus, the changeover from the active router module to the standby module takes place transparently for the other routers of the network, and without generating any delay due to non-availability.

BRIEF DESCRIPTION OF THE DRAWINGS

The invention, and its advantages appear more clearly from the following description of an implementation, given with reference to the accompanying figures, in which:

FIG. 1 (already described) shows the environment of a router;

FIG. 2 (also already described) shows the state machine associated with an interface in a router; and FIG. 3 very diagrammatically shows a router of the invention.

FIG. 3 shows that the router S comprises two router modules $MR_1$ and $MR_2$. These two router modules perform the same functions as the routers of the state of the art.

MORE DETAILED DESCRIPTION

However, in addition, the two router modules have means for communicating between each other, e.g. via a shared memory M.

More precisely, each of the router modules $MR_1$, and $MR_2$ has data storage means for storing data relating to its state machine, when said sate machine is in a stable state, and data retrieval means for retrieving said data. The data storage means may therefore be means for writing in the shared memory M, and the data retrieval means may be means for reading from said shared memory M.

However, other implementations of the invention are possible, in particular by using a software bus such as a Common Object Request Broker Architecture (CORBA) bus.

At any given time, only one of the two router modules is in the active state, i.e. is performing its router function. The other router module is in the standby state, i.e. it is invisible to the network but it is ready to take over the function of the active router module if said active router module fails or is shut down.

Data storage is implemented only by the router module in the active state, each time the state machine enters a stable state. These stable states are the "Down", "Point to Point", "Backup", "DR" and "DROther" states, i.e. the states for which the connection is determined.

The data to be stored contains at least one identifier for identifying the state of the state machine. However, it is possible also to store other data in order to facilitate starting up the standby router module when necessary.

In an implementation of the invention, data relating to the interface is stored when creating the interface and when deleting it. This data is the data making it possible to create the interface in compliance with Section 9 of above-mentioned RFC 2328.

FIG. 3 shows a particular implementation using a shared memory.

In this implementation, the router S has two interfaces $I_1$ and $I_2$, the first with a network N, and the second with a network made up of a single router R. Therefore, each of the router modules $MR_1$ and $MR_2$ has two state machines, one associated with the interface $I_1$ and the other associated with the interface $I_2$.

In a typical operating example, the first state machine is in a "DR" state, and the other state machine is in a "Point to Point" state. Since these are stable states, as defined above, a state identifier is stored by the router module in the active state (e.g. $MR_1$) in the shared memory M.

When the router module $MR_1$ becomes non-operational, e.g. when it is shut down for maintenance or when it fails, the router module $MR_2$ goes from the standby state to the active state.

Whereupon the router module $MR_2$ can read back firstly the data relating to the states of both state machines, and secondly the data relating to the interfaces, as stored when the interfaces were created.

Thus, the router module $MR_2$ knows that it must force the state machine associated with the interface $I_2$ to go to the "Point to Point" state, and that it must force the state machine associated with the $I_1$ interface to go to the "DR" state.

The router module $MR_2$ can then take over the function of the router module $MR_1$ very quickly and also transparently for the other router modules of the network.

Other implementations are naturally accessible to the person skilled in the art. In particular, the two router modules may communicate via inter-process communications means. For example, the inter-process communications means may be a software bus, such as the CORBA software bus in compliance with the specifications of the Object Management Group (OMG).

The data storage step may then be preceded by a data sending step in which the data is sent to the router module on standby, which module then has to store the data so that it can be retrieved when a state transition occurs.

The invention claimed is:

1. A router comprising:
   at least two router modules, only one of which is in an active state at any given time, the other router modules being in a standby state; and
   changeover means which causes one of said other router modules to go from a standby state to an active state if the router module in the active state stops,
   each of said at least two router modules having connections with at least one network, and having at least one state machine, each state machine managing an interface associated with one of said connections,
   wherein each of said at least two router modules has data storage means which, in the active state, enable storing of data relating to the state of said at least one state machine, if said at least one state machine is in a stable state, and data retrieval means for retrieving said data if a changeover occurs.

2. The router according to claim 1, in which said data is stored by a shared memory that is shared between said at least two router modules.

3. The router according to claim 1, in which said data is stored by inter-process communications means enabling said at least two router modules to communicate with one another.

4. The router according to claim 3, in which said inter-process communications means are a common object request broker architecture software bus.

5. The router according to claim 1, in which each of said at least two router modules further comprise a means for storing data relating to an associated interface when said associated interface is created, and a means for retrieving said data relating to the associated interface if a changeover to the active state occurs.

6. The router according to claim 5, in which the stable state is a state from the following list: "Down", "Point to Point", "DROther", "Backup", and "DR" in an open shortest path first protocol.

7. The router according to claim 1, wherein the data retrieval means retrieves the data by reading the stored data.

* * * * *